Aug. 30, 1960  J. E. McDONALD  2,950,557
HIGH SPEED FISH AND SHRIMP TRAWL
Filed Feb. 13, 1959  2 Sheets-Sheet 1
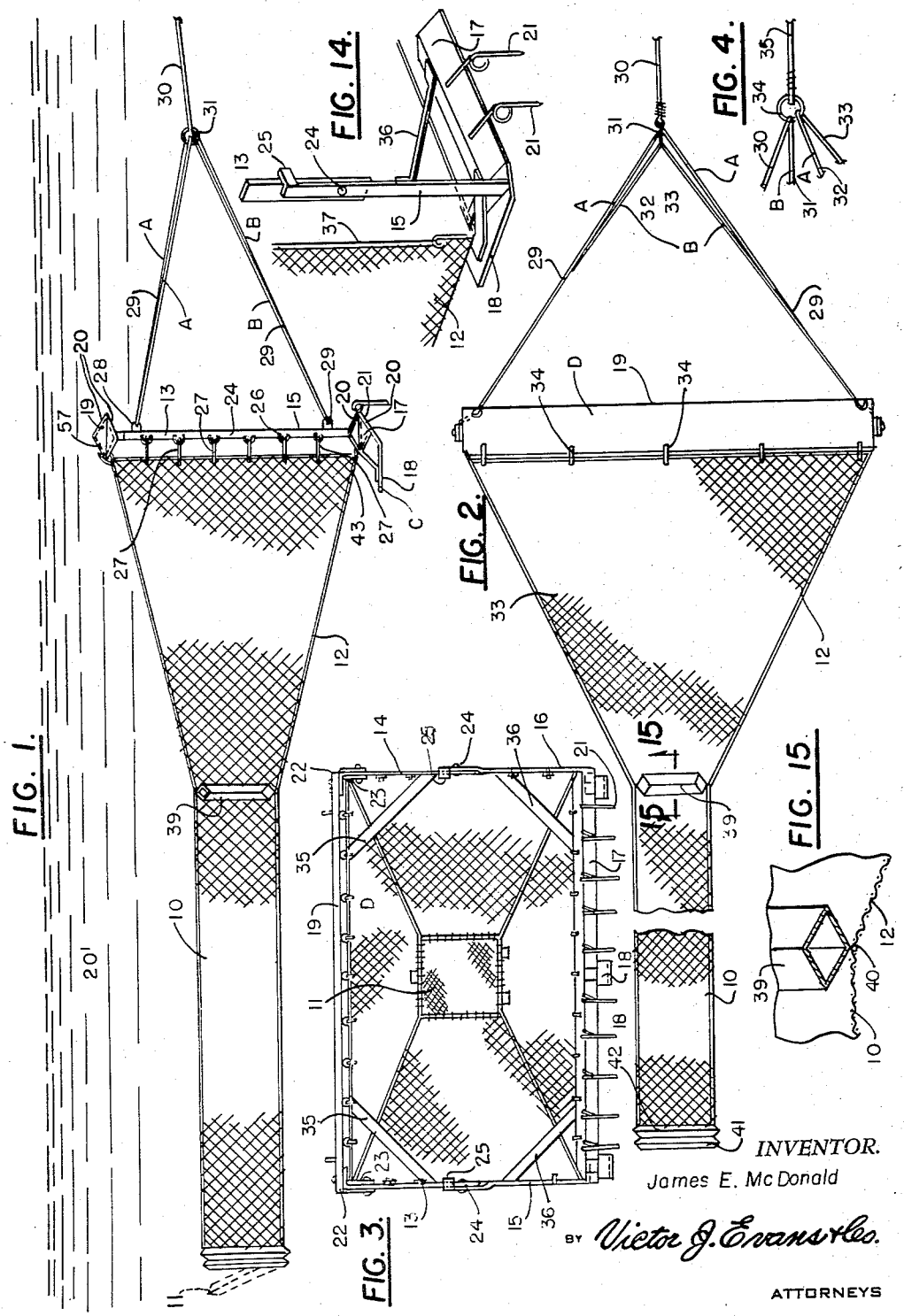
INVENTOR.
James E. McDonald
BY *Victor J. Evans & Co.*
ATTORNEYS Aug. 30, 1960    J. E. McDONALD    2,950,557
HIGH SPEED FISH AND SHRIMP TRAWL
Filed Feb. 13, 1959    2 Sheets-Sheet 2
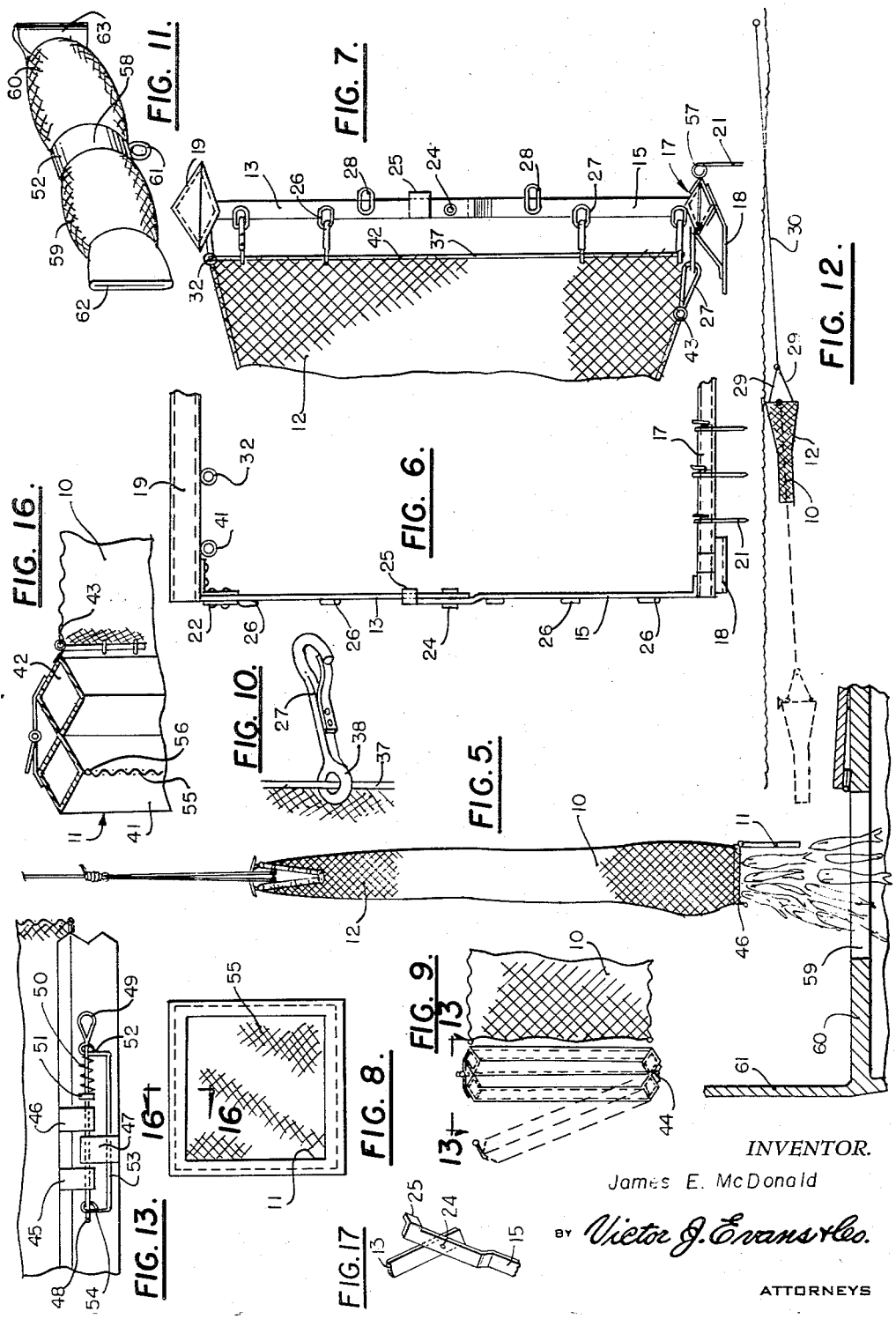
INVENTOR.
James E. McDonald
BY Victor J. Evans & Co.
ATTORNEYS United States Patent Office 2,950,557
Patented Aug. 30, 1960

2,950,557

HIGH SPEED FISH AND SHRIMP TRAWL

James E. McDonald, Houston, Tex.
(Rte. 2, Box 289, Gulfport, Miss.)

Filed Feb. 13, 1959, Ser. No. 793,024

9 Claims. (Cl. 43—9)

This invention relates to trawls, or nets for shrimp and fish where the net is drawn through the water at comparatively high speed by a fishing boat, and in particular a trawl having a wide mouth with side and end portions converging from the mouth to a smaller rectangular-shaped tubular section with a hinged door at the extreme end of the tubular section through which the shrimp and fish are dumped into the hatch of a boat or into a container.

The purpose of this invention is to provide a fishing net or trawl in which the mouth is held open by a rectangular-shaped frame and wherein the net trails behind the frame with shrimp and fish disturbed by spring fingers depending from the lower edge of the frame and traveling through mud of a bay bottom or river bed are received in the net with the trawl traveling at comparatively high speed.

The usual type of net that is towed between two boats bows rearwardly as it is drawn through the water whereby the upper and lower edges are drawn together so that the effective area of the net is reduced. Where nets have been formed with frames the frames have been made of boards or heavy timbers and it is difficult to tow the heavy timbers through the water with a timber on the lower side of the net on the bottom or on the river bed. With this thought in mind this invention contemplates a comparatively lightweight frame with spring fingers and spaced shoes on the lower edge and with the forward portion of the net following the frame having converging sides so that shrimp and fish stirred by the spring fingers on the lower edge of the frame are received in the mouth and carried aft by water rushing through the net to an elongated tubular shaped section where the shrimp and fish are trapped until the net is drawn upwardly over the deck of a boat.

The object of this invention is, therefore, to provide a trawl particularly designed for shrimp which assumes a horizontal position as it is drawn through water at comparatively high speed and wherein spring fingers depending from the lower edge of the leading or open end pass through mud at the bottom causing the shrimp to jump upwardly whereby they are received in the forward end or mouth of the trawl.

Another object of the invention is to provide means for attaching a hawser to a frame forming the mouth of a trawl whereby the trawl may be drawn over the river bed or bay bottom in a horizontal position and with the frame at the leading end in an upright position.

Another object of the invention is to provide means for floating the trailing end of a trawl being drawn through the water so that the trailing portion of the trawl assumes a comparatively horizontal position.

A further object of the invention is to provide an improved high speed trawl which is of a simple and economical construction.

With these and other objects and advantages in view the invention embodies a fish and shrimp trawl having a mouth formed with a rectangular-shaped frame having upper and lower sealed hollow beams, diamond-shaped in cross section with the frame hinged midway of the height thereof and with the net following the frame having converging portions leading into an elongated fish and shrimp retaining tubular section having a door with a hollow tubular buoyant frame at the trailing end thereof.

Other features and advantages of the invention will appear from the following description taken in connection with the drawings, wherein:

Figure 1 is a side elevational view of the fish and shrimp trawl illustrating the position of the trawl as it is drawn through the water.

Figure 2 is a plan view of the trawl with parts broken away.

Figure 3 is a front elevational view looking toward the mouth of the trawl.

Figure 4 is a view illustrating the connections of a bridle extended from the frame to a hawser.

Figure 5 is a view illustrating the trawl in the position of dumping fish therefrom into a hatch on the deck of a boat.

Figure 6 is a view on an enlarged scale illustrating the construction of one side of the frame at the mouth of the trawl.

Figure 7 is a side elevational view also on an enlarged scale showing the construction of the frame at the mouth of the trawl.

Figure 8 is a view illustrating the door at the aft end of the trawl.

Figure 9 is a side elevational view showing a section through the trailing end of the trawl illustrating the door therein.

Figure 10 is a view illustrating a harness snap by which the forward end of the net is attached to rings on the frame.

Figure 11 is a view illustrating a modification of the trawl wherein a buoyant member or float formed of an inner tube may be used for floating the ends of the trawl.

Figure 12 is a view illustrating the position of the trawl in relation to the end of a boom extended from the deck of a boat and showing the elevation of the trawl in proportion to the length of the hawser and height of the end of the boom.

Figure 13 is a plan view taken on line 13—13 of Figure 9 illustrating a latch for retaining the door in the trailing end of the trawl in the closed position.

Figure 14 is a perspective view showing a lower corner of one side of the frame of the mouth of the trawl illustrating the connections of the net to the frame and also showing a mouning of spring fingers depending from the leading side of the lower beam of the frame and spacing shoes holding the lower beam whereby the lower beam is retained in an elevated position above the river bed or bay bottom.

Figure 15 is a section taken on line 15—15 of Figure 2 showing the connection between the converging side portions of the trawl and the tubular trailing section thereof.

Figure 16 is a cross section taken on line 16—16 of Figure 8 showing a tubular frame at the end of the tubular section of the trawl and the frame of the door hinged in the trailing end of the tubular section of the trawl.

Figure 17 is a fragmentary view illustrating certain constructional details of the hinge joint and stop member.

Referring now to the drawings wherein like reference characters denote corresponding parts the improved shrimp and fish trawl of this invention includes a net having an elongated rectangular-shaped tubular fish and shrimp retaining section 10, a door 11 at the trailing end of the section 10, a leading section 12 having outwardly diverging sides and end portions, a first rectangular-shaped frame including an inverted U-shaped upper section having arms 13 and 14 hinged or pivotally connected to similar arms 15 and 16 of a lower U-shaped section having a sealed hollow buoyancy beam 17 mounted on shoes 18, the arms 13 and 14 extending from the ends of an upper sealed hollow buoyant beam 19, the beams 17 and 19 being diamond-shaped in cross section having beveled leading surfaces 20, and spring fingers 21 carried by the beam of the lower section of the frame and positioned to extend downwardly into mud on the bay bottom or river bed over which the trawl is towed.

The upper ends of the end bars 13 and 14 are secured, such as by welding to the ends of the sealed hollow upper beam 19 as shown at the points 22, and the connections are reinforced by clip angles 23 as shown in Figure 3. The lower ends of the bars are pivotally connected to upper ends of the end bars 15 and 16 of the frame by bolts 24 forming hinges and the upper ends of the bars 15 and 16 are provided with lugs 25 forming stops that limit the opening movements of the frame sections. The lower ends of the bars 15 and 16 are secured to ends of the lower buoyant beam 17, also by welding, or the like.

The end bars of the upper and lower frame sections are also provided with loops 26 in which snap fasteners 27, illustrated in Figure 10, are snapped to support the net from the end frames. It will be appreciated that as many of the snap fasteners 27 and rings 26 may be used on the end bars of the frames as many be desired. In Figure 17, there is illustrated the hinge point 24 as well as the stop portion 25, and when the device is to be folded, the sections are pivoted about the hinge point 24, as shown in the drawings.

The side bars 13, 14, 15, and 16 are also provided with loops 28 to which cables 29 are connected and, as illustrated in Figure 2 the extended ends of the cables are connected to a hawser 30 by a ring 31.

The under surface of the upper beam 19 is provided with eyes 32 by which the upper web 33 of the converging portion 12 of the net is connected by fasteners 34 to the upper beam.

The end bars 13 and 14 of the upper portion of the frame are supported from the upper beam 19 by diagonal braces 35 and the lower end bars 15 and 16 are supported from the lower beam 17 by similar braces 36.

The leading end of the net is provided with a continuous loop 37 which extends through eyes 38 of the snap fasteners 27 and also through the fasteners 34 connecting the upper web 33 to the upper beam 19 and the ends of the strands of the net are secured to the loop 37 by suitable means.

An inner tube or buoyant second frame 39, also diamond-shaped in cross section is provided at the intersection of the portions 10 and 12 of the net and said portions are connected to the outer surface of the tube 39 by suitable fasteners 40, as shown in Figure 15.

The door 11 at the trailing end of the tubular section 10 of the trawl is formed with a rectangular-shaped frame 41 also diamond-shaped in cross section and the lower side of the frame 41 is connected to a similar frame 42 connected to the tubular section 10 of the trawl by fasteners 43 and the door member by hinges 44 mounted on the lower portion of the frame 41. The door is retained in the closed position by a latch, as shown in Figure 13 in which eyes 45 and 46 on the frame 42 mesh with an eye 47 on the frame 41 of the door and a pin 48 having a handle 49 on the outer end extends through the eyes. The pin 48 is provided with a spring 50 that is positioned between a collar 51 on the pin and an eye 52 on an arm 53 extended from the eye and having an eye 54 on the extended end in which the end of the pin 48 is positioned. With the latch formed in this manner drawing the handle 49 to the right, from the position shown in Figure 13 compresses the spring drawing the end of the pin 48 through the meshing eyes 45, 46, and 47 thereby releasing the eyes so that the door may be opened. The frame 41 of the door is covered with mesh or netting 55 which is connected to the inner point or vertex of the door frame as shown at the point 56.

The spring fingers 21 which are provided with coils or loops 57 are preferably formed of spring steel, however, it is to be understood that the fingers may be formed of other suitable material.

The trawl may also be provided with a buoyant member, as illustrated in Figure 11, in which a section 58, of an inner tube and which is provided with reinforcing sleeves 59 and 60 may be attached to the trawl at different points by attaching fastening elements to eyes 61. The ends of the tube may be flattened and heat sealed as shown at the points 62 and 63. The eyes 61 may be attached to the upper beam 19 or to upper portions of the door frame as may be desired.

With the parts assembled as illustrated and described the hawser 30 is attached to a boat or to a tow boom and as the trawl is lowered into the water the buoyant beams and frames retard downward movement thereof until the boat picks up speed and with the boat traveling at comparatively high speed the shoes 18 slide on the surface of a bay bottom or river bed with the spring fingers 21 extending into mud at the bottom whereby the fingers disturb shrimp and the like buried in the mud causing the shrimp to snap upwardly with the result that the forward travel of the trawl causes the shrimp to pass into the mouth of the net and into the tubular section 10 in the rear portion.

Upon encountering an obstruction on the bottom or river bed the spring fingers bend and the shoes ride over the obstruction whereby the lower edge of the net is retained in spaced relation to a fixed object at all times. Danger of damaging a net with a trawl operating at comparatively high speed is, therefore, substantially eliminated.

It will be understood that modifications, within the scope of the appended claims, may be made in the design and arrangement of the parts without departing from the spirit of the invention.

What is claimed is:

1. A trawl comprising a rectangular-shape frame, said frame including opposed U-shaped sections having horizontal sealed hollow beams with bars at the ends, means pivotally connecting the bars, the beams providing buoyant means on the upper and lower sections of the frame, a net having converging portions extended from the frame, the net having a tubular section extended from the converging portions, a door in the trailing end of the tubular portion, and a hawser extended from the frame for connecting the trawl to a boat.

2. A trawl comprising a vertically disposed rectangular-shaped first frame, the frame including upper and lower U-shaped sections having beams with inwardly extended end bars, means pivotally connecting the end bars and the beams, the upper and lower beams being diamond-shaped in cross section and being sealed thereby providing buoyant elements, a net including converging webs extended from the frame, a tubular section, rectangular-shaped in cross section extended from the converging webs, and a sealed second frame diamond shaped in cross section positioned in the end of the tubular portion of the net, from which the converging webs extend, and a hawser for connecting the trawl to a boat.

3. A trawl comprising a vertically disposed rectangular-shaped first frame, the frame including upper and lower beams with inwardly extended end bars, means pivotally connecting the end bars, the upper and lower beams being diamond-shaped in cross section and being sealed thereby providing buoyant elements, spaced spring fingers mounted on and depending from the lower beam of the frame, a net including converging webs extended from the frame, and a tubular section, rectangular-shaped in cross section extended from the converging webs, a sealed second frame diamond-shaped in cross section positioned in the end of the tubular portion of the net, a door also having a frame, diamond-shaped in cross section hinged to the frame in the trailing end of the net, a latch for retaining the door in the closed position, and a hawser for connecting the trawl to a boat.

4. A trawl comprising a vertically disposed rectangular-shaped first frame, the frame including upper and lower beams with inwardly extended end bars, means pivotally connecting the end bars, the upper and lower beams being diamond-shaped in cross section and being sealed thereby providing buoyant elements, spaced spring fingers mounted on and depending from the lower beam of the frame, shoes also mounted on and depending from the lower beam of the frame, said shoes being extended rearwardly from the beam, a net including converging webs extended from the frame, and a tubular section, rectangular-shaped in cross section extended from the converging webs, a sealed second frame diamond-shaped in cross section positioned in the ends of the tubular portion of the net, a door also having a frame, diamond-shaped in cross section hinged to the frame in the trailing end of the net, a latch for retaining the door in the closed position, and a hawser for connecting the trawl to a boat.

5. A trawl comprising an elongated fish retaining section, a door hinged in the aft end of the fish retaining section, a rectangular-shaped frame spaced from the forward end of the fish retaining section, said rectangular shaped frame comprising U-shaped upper and lower sections hinged at the ends intermediate of the height of said rectangular frame, a connecting net section having outwardly diverging walls positioned between the forward end of the fish retaining section and the frame, and means connecting the forward end of the said connecting net section to the frame.

6. A fishing net comprising an elongated fish retaining section, a door in the aft end of the fish retaining section, a rectangular-shaped frame including U-shaped upper and lower sections hinged at the ends intermediate of the height of the frame spaced from the forward end of the said fish retaining section, a connecting net section having outwardly diverging walls positioned between the forward end of the fish retaining section and the frame, and means connecting the forward end of the said connecting net section to the frame.

7. A fishing net comprising an elongated fish retaining section, a door at the aft end of the fish retaining section, a rectangular-shaped frame including U-shaped upper and lower sections hinged at the ends intermediate of the height of the frame spaced from the forward end of the said fish retaining section, spaced shoes mounted on the lower end of the frame, a connecting net section having outwardly diverging walls positioned between the forward end of the fish retaining section and the frame, and means connecting the forward end of the said connecting net section to the frame.

8. A fishing net comprising an elongated fish retaining section, a door hinged in the aft end of the fish retaining section, a rectangular-shaped frame including U-shaped upper and lower sections hinged at the ends intermediate of the height of the frame spaced from the forward end of the said fish retaining section, spaced shoes mounted on the lower end of the frame, a connecting net section having outwardly diverging walls positioned between the forward end of the fish retaining section and the frame, links positioned on the side and end members of the frame and snaps carried by the forward end of the said connecting neck section and connected to the said links whereby the forward end of the connecting net section is spaced from the frame.

9. A fishing trawl comprising an elongated fish retaining section, a door hinged in the aft end of the fish retaining section, a rectangular-shaped frame including U-shaped upper and lower sections hinged at the ends intermediate of the height of the frame spaced from the forward end of the said fish retaining section, spaced shoes mounted on the lower end of the frame, spaced spring fingers carried by and depending from the lower portion of the frame, a connecting net section having outwardly diverging walls positioned between the forward end of the fish retaining section and the frame, means connecting the forward end of the said connecting net section to the frame with the forward end of the connecting net section spaced from the frame, and buoyant elements connected to the ends of the net.

References Cited in the file of this patent

UNITED STATES PATENTS

| | | |
|---|---|---|
| 2,300,178 | Ross | Oct. 27, 1942 |
| 2,618,879 | Lewis | Nov. 25, 1952 |

FOREIGN PATENTS

| | | |
|---|---|---|
| 633,672 | France | Oct. 29, 1927 |